Jan. 26, 1960    J. Z. DE LOREAN    2,922,635
VEHICLE SUSPENSION
Filed June 19, 1957    2 Sheets-Sheet 1

INVENTOR.
John DeLorean
BY
R. R. Barnard
ATTORNEY

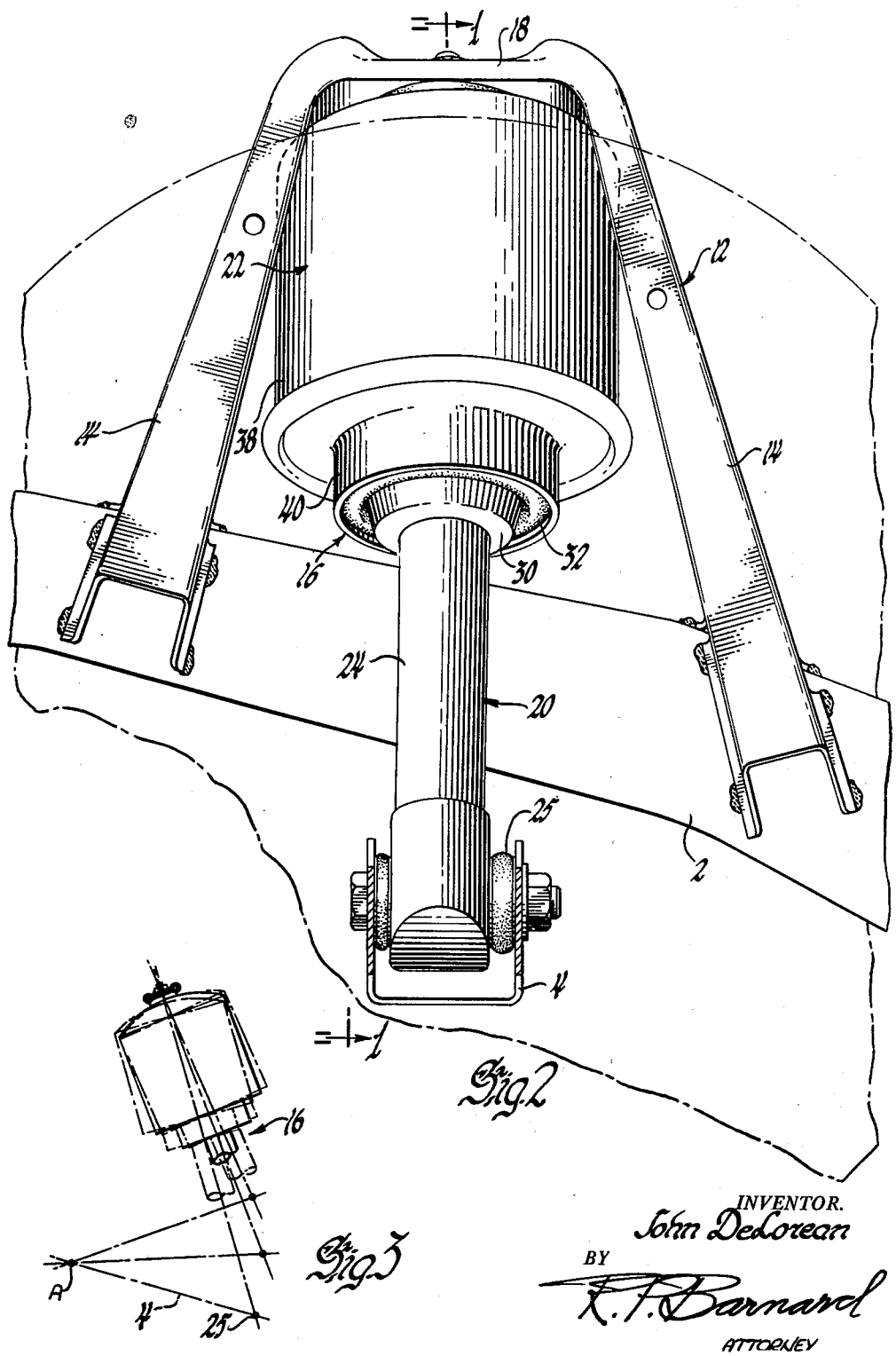

United States Patent Office 2,922,635
Patented Jan. 26, 1960

2,922,635

VEHICLE SUSPENSION

John Z. DeLorean, Birmingham, Mich., assignor to General Motors Corporation, Detroit, Mich., a corporation of Delaware Application June 19, 1957, Serial No. 666,526

6 Claims. (Cl. 267—15)

The present invention relates to a vehicle fluid suspension and, in particular, to the fluid spring thereof.

Vehicle suspension systems of the type herein contemplated typically include a sprung mass mounted on ground engaging wheels, and an air spring element operatively connected between the wheels and sprung mass to control relative movement therebetween. In these constructions, the air spring includes piston and cylinder elements disposed for relative axial movement to control the aforementioned movement between the sprung mass and vehicle wheels. Since the wheels are ordinarily connected by an arm for pivotal movement relative to the sprung mass, one of the elements of the air spring will be connected to this pivotally movable arm while the other element thereof is connected to the sprung mass. Moreover, the air spring usually includes a can or dome acting as a cylinder element, and into which the piston element may reciprocate. The piston element can take many forms, but one common type is a piston head radially spaced from the wall of the dome and engaging a flexible bladder or diaphragm the peripheral outer edge of which is firmly seated in the air spring dome.

In prior art constructions, as the vehicle wheels oscillated vertically the connection thereto of the air spring would travel in an arc due to the pivotal mounting of the vehicle wheel to the sprung mass. This often results in the spring element connected to the wheel supporting means being canted out of axial alignment with the other element. As a result, the flexible membrane or diaphragm is often squeezed between the piston and cylinder elements resulting in damage to the diaphragm and leakage in the spring. Moreover, it is usual practice to equip a suspension of the type aforedescribed with a separate shock absorber extending between the wheel supporting means and the sprung mass to dampen relative oscillation therebetween.

The present invention is directed to a vehicle suspension mechanism comprising a frame, ground engaging wheels, arm means operatively connected to said wheels and pivotally connected to the frame for arcuate movement of the wheels in a substantially vertical plane relative to the frame, and a fluid spring for controlling this movement, said spring combining an air spring and a conventional shock absorber.

Moreover, the present invention relates to a means for mounting an air spring, or a combination air spring and shock absorber, between the sprung mass of the vehicle and its wheel supporting means in such a manner as to maintain the spring elements in coaxial alignment during relative arcuate movement or oscillation between the sprung mass and vehicle wheels.

According to another feature of this invention, it is also intended to provide a fluid spring in a suspension of the type described which combines an air spring with a conventional shock absorber, there being means provided to supply super-atmospheric air from the air spring to the cylinder of the shock absorber to prevent or substantially reduce frothing in the shock absorber hydraulic liquid.

These and other objects, features and advantages of this invention will appear more fully hereinafter as the description of the invention proceeds and in which reference is made to the following drawings in which:

Figure 2 is a side elevation taken along line 2—2 of Figure 1;

Figure 3 is a schematic drawing, exaggerated to some extent, to show the action of the spring of the suspension.

Figure 1:
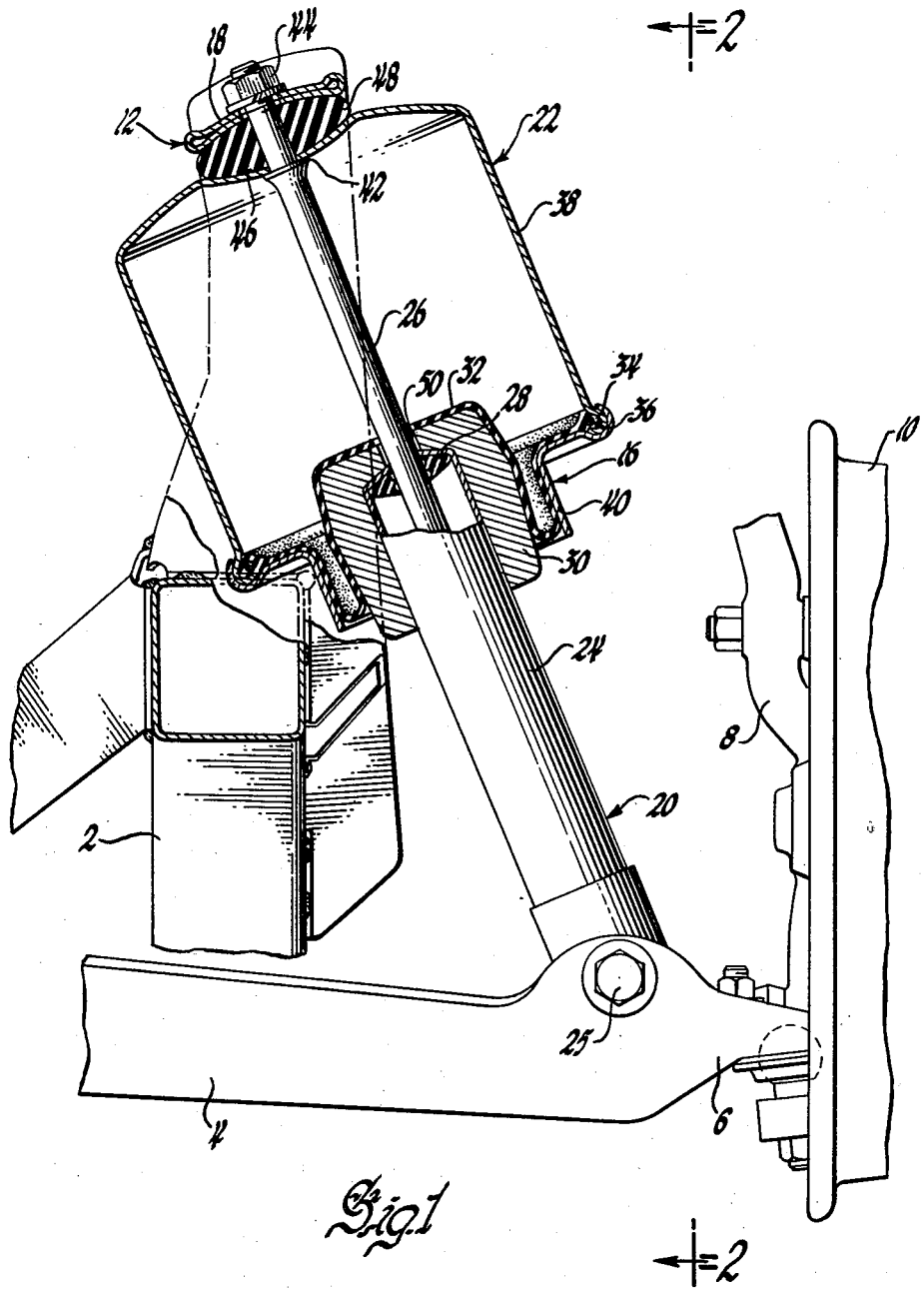
Figure 1 is a front view of a vehicle suspension and a cross section of the fluid spring of this invention taken along the line 1—1 of Figure 2.

Referring now to the drawings, there is shown a vehicle suspension of the pneumatic type for the front wheels of a vehicle. Although the suspension has been shown for illustrative purposes with a front suspension, it will be quite clear as the description of the invention proceeds that the teachings thereof can be utilized in conjunction with rear wheel suspensions. In the drawings, there is shown a vehicle frame having a side rail member 2 of the usual construction. A lower control arm 4 is pivotally mounted in the usual manner (not shown) to the vehicle frame to permit the arm to oscillate in a vertical plane. At its outboard end 6, the arm 4 is operatively connected in a usual manner to a knuckle 8 on which the vehicle wheel 10 is mounted. In addition, an upper control arm is also operatively pivotally connected between the vehicle frame and the upper end of the knuckle 8. The upper control arm has been eliminated from the drawing so as not to interfere with a clear showing of the features of this invention, but it will be realized that this arm will be connected between the vehicle and the wheel in the usual manner.

A downwardly opening substantially U-shaped arch 12 has its legs 14 rigidly secured to the side rail 2 of the vehicle. A fluid spring 16 is adapted for connection between the lower control arm 4 and the cross member 18 of the arch 12 in a manner to be described hereinafter.

The fluid spring 16 includes a conventional shock absorber 20 and a conventional air spring 22. The shock absorber 20 comprises the usual cylinder 24 having its lower end pivoted to the lower control arm at 25 by a plain pivot bearing. Reciprocably coaxially disposed within the cylinder of the shock absorber is a piston (not shown) having a piston rod 26 extending through the upper end of the cylinder. A fluid type seal 28 surrounds the piston rod to seal off the inner portion of the shock absorber cylinder. The air spring comprises a piston portion which includes the piston head 30 firmly seated around the upper end of the shock absorber cylinder 24, and a flexible diaphragm 32 overlying the head of the air spring piston, and having its outer peripheral bead 34 firmly secured in any suitable manner to an inturned flange 36 at the lower edge of the air spring dome 38. A skirt 40 of substantially circular cross section surrounds and is radially spaced from the piston head 30 and is crimped to the lower portion of the air spring dome adjacent its connection to the diaphragm. It will be noted that the air spring dome 38 is seated on a radially extending shoulder 42 formed at the upper end of the piston rod. This connection prevents the air spring dome from moving downwardly in Figures 1 and 2 along the piston rod.

The piston rod 26 and air spring dome 38 may be secured to the cross member 18 of the arch 12 by any suitable means such as a bolt 44. Disposed between the lower surface of the arch cross member 18 and a concave recess 46 in the central portion of the air spring dome is a resilient preferably rubber cushion or doughnut 48 which surrounds the piston rod and firmly seats against the arch and cylinder dome. This doughnut or resilient cushion forms a rockable connection between the air spring 22 and the arch, while the shock absorber 20 is pivotally mounted adjacent the connection of the lower arm to the vehicle wheel as aforedescribed.

In operation, the shock absorber cylinder and air spring piston will move together relative to the air spring dome and the shock absorber piston rod. All of the respective parts of the fluid spring are mounted for coaxial reciprocation. As aforementioned, in the usual spring mounting oscillatory movement between the vehicle wheel and the sprung mass often causes the air spring piston 30 to cant to one side or come out of axial alignment with the air spring dome 38 thereby pinching the flexible diaphragm 32 between the wall of the piston head and the cylinder skirt 40. However, by using the resilient cushion 48, the entire fluid spring may rock against it to maintain the parts coaxial.

This operation may be seen more clearly by referring to Figure 3 in which the fluid spring 16 is shown in an extended, neutral and retracted position. From this schematic drawing, it will be clear that as the sprung mass and wheels oscillate vertically relative to each other the pivotal connection 25 of the spring 16 to the arm 4 will move in an arc about the pivotal connection "A" of the lower control arm to the vehicle. By using the resilient mounting of this invention, the entire fluid spring can rock angularly about the cushion as such oscillation takes place thereby maintaining the respective parts of the spring substantially coaxial. It will, of course, be appreciated that the connection of the shock absorber piston rod 26 to the cross member 18 of arch 12 is such as to enable the assembly to accommodate the aforedescribed rocking movement.

According to another feature of this invention, an annular relief or passage 50 is formed about the shock absorber piston rod, through flexible diaphragm 32, air spring piston head 30 and top wall of the shock absorber cylinder 24 thereby permitting super-atmospheric air to pass therethrough and through the fluid seal 28 into the shock absorber cylinder to prevent or substantially reduce frothing of oil in the cylinder.

Although a spring mounting as herein shown may be particularly advantageously employed in a front wheel suspension in which the lower control arm is relatively short thereby producing a deeper arc of travel of pivot point 24, it will also be appreciated that the concepts of this invention may also be employed in rear wheel suspensions. Therefore, it is not intended to be limited to the specific construction shown in the drawings, but only by the scope of the claims which follow.

What is claimed is:

1. A fluid suspension mechanism for a vehicle comprising a frame, ground engaging wheels, arm means operatively connected to said wheels and pivotally connected to said frame for relative arcuate movement of said wheels with respect to said frame in a substantially vertical plane, and means controlling said relative movement, said means comprising a hydraulic shock absorber cylinder pivotally connected to said arm, a shock absorber piston reciprocably disposed within said cylinder, a piston rod carried by said piston and extending through the upper end of said shock absorber cylinder, an air spring comprising an air spring piston fitted about said piston rod and secured over said shock absorber cylinder, an air spring cylinder in which said spring piston is reciprocably disposed, means preventing relative axial movement between said air spring cylinder and piston rod, and means for connecting said shock absorber piston rod and air spring cylinder to said frame, said means including an extension of said rod projecting through said air spring cylinder and engaging said frame, and a resilient cushion surrounding said rod and disposed in compression between said frame and said air spring cylinder whereby, as relative arcuate movement of said arm occurs relative to said frame, rocking movement of said air spring and shock absorber about said cushion maintains them substantially coaxial.

2. A fluid suspension mechanism for a vehicle comprising a frame, ground engaging wheels, arm means operatively connected to said wheels and pivotally connected to said frame for relative arcuate movement of said wheels with respect to said frame in a substantially vertical plane, and means controlling said relative movement, said means comprising a hydraulic shock absorber cylinder pivotally connected to said arm, a shock absorber piston reciprocably disposed within said cylinder, a piston rod carried by said piston and extending through the upper end of said shock absorber cylinder, an air spring comprising an air spring piston fitted about said piston rod and secured over said shock absorber cylinder, an air cylinder in which said spring piston is reciprocably disposed, said vehicle frame including an upstanding arch, and means for connecting said shock absorber piston rod and air spring cylinder member to said arch, said rod and air spring cylinder member to said arch, said means including a resilient cushion surrounding said rod and seated on the upper end of said air spring cylinder and on said arch whereby, as relative arcuate movement of said arm occurs relative to said frame, rocking movement of said air spring and shock absorber about said cushion maintains them substantially coaxial.

3. A fluid suspension mechanism for a vehicle comprising a frame, ground engaging wheels, arm means operatively connected to said wheels and pivotally connected to said frame for relative arcuate movement between said wheels and frame, and means controlling said relative movement, said means comprising a shock absorber cylinder having one end pivotally connected to said arm, a piston reciprocably disposed within said cylinder and having a rod extending out of the other end of said cylinder, an air spring, said air spring comprising a piston element surrounding said piston rod and fixed to said other end of said shock absorber cylinder for movement therewith relative to said rod, an air spring cylinder supported on and axially fixed with respect to said rod, said air spring and shock absorber elements being mounted substantially coaxially with each other, and means for mounting said shock absorber piston rod and air spring cylinder to said frame, said means including a reduced portion on said rod projecting through said spring cylinder and engaging said frame, a resilient cushion surrounding said rod between said air spring cylinder and said frame and means for compressively loading said cushion, whereby upon movement of said wheel and arm means relative to said frame said relative movement controlling means will rock and the elements thereof will remain substantially coaxial.

4. In a vehicle suspension including a frame and an oscillatable wheel supporting element, the combination of an air spring and a telescoping shock absorber arranged in concentric relation, said shock absorber including a casing pivoted to said supporting element and a reciprocable piston rod engaging said frame, said air spring comprising an inverted cup-shaped member having its closed end pivoted on said rod in concentric relation therewith, means for supporting said member at a predetermined position axially of said rod, a flexible diaphragm closing the open end of said member, a piston of substantially smaller diameter than said cup-shaped member secured on said shock absorber casing and engaging said diaphragm, said diaphragm forming an annular convolution maintaining the other end of said cup-shaped member concentric with said rod, and a resilient element surrounding the end of said rod, said element being compressed between the closed end of said cup-shaped member and said frame thereby providing a seal preventing leakage from said cup-shaped member and permitting limited rocking motion of said shock absorber and air spring as required by the oscillatory path of said wheel supporting member.

5. In a vehicle suspension including a frame and an oscillatable wheel supporting element, the combination of an air spring and a telescoping shock absorber arranged in concentric relation, said shock absorber including a casing pivoted on said supporting element and a reciprocable piston rod engaging said frame, said air spring comprising an inverted cup-shaped member having a closed end formed with a central aperture surrounding said rod, means for supporting said member at a predetermined position axially of said rod, a flexible diaphragm closing the open end of said member, a piston secured on said shock absorber casing and engaging said diaphragm, and a resilient element surrounding the end of said rod, said element being compressed between the closed end of said cup-shaped member and said frame thereby providing a seal preventing leakage from said cup-shaped member while permitting limited rocking motion of said shock absorber and air spring as required by the oscillatory path of said wheel supporting member.

6. The structure set forth in claim 5 wherein said means for supporting said member axially of said rod comprises an integral flange near the end of said rod.

References Cited in the file of this patent

UNITED STATES PATENTS

| | | |
|---|---|---|
| 971,583 | Bell | Oct. 4, 1910 |
| 1,831,136 | Reed | Nov. 10, 1931 |
| 2,056,106 | Kuhn | Sept. 29, 1936 |
| 2,415,026 | Brown | Jan. 28, 1947 |
| 2,531,368 | Tack et al. | Nov. 21, 1950 |
| 2,653,681 | McIntyre | Sept. 29, 1953 |
| 2,802,664 | Jackson | Aug. 13, 1957 |